United States Patent

Marjanski et al.

[11] Patent Number: 5,542,691
[45] Date of Patent: Aug. 6, 1996

[54] EXTERIOR SEAT BACK MOUNTED SIDE IMPACT AIRBAG MODULE ASSEMBLY

[75] Inventors: George C. Marjanski, Riverdale; Kevin E. Hauppa, Ogden; David J. Green, Brigham City; Davin G. Saderholm, Salt Lake City; Brent R. Beesley, Layton, all of Utah

[73] Assignee: Morton International, Inc., Chicago, Ill.

[21] Appl. No.: 524,874

[22] Filed: Sep. 7, 1995

[51] Int. Cl.$^6$ ............................ B60R 21/16
[52] U.S. Cl. .................... 280/728.2; 280/730.2
[58] Field of Search ............ 280/728.2 O, 730.2 R, 280/730.1, 743.1

[56] References Cited

U.S. PATENT DOCUMENTS

| | | | |
|---|---|---|---|
| 3,656,790 | 4/1972 | Truesdell | 280/728.2 X |
| 4,946,191 | 4/1990 | Putsch | 280/730.2 |
| 5,238,263 | 8/1993 | Sinnhuber | 280/730.2 |
| 5,324,072 | 6/1994 | Olson et al. | 280/730 A |
| 5,333,897 | 8/1994 | Landis et al. | 280/728.2 |
| 5,462,308 | 10/1995 | Seki et al. | 280/730.2 X |

FOREIGN PATENT DOCUMENTS

| | | | |
|---|---|---|---|
| 4-050052 | 2/1992 | Japan | 280/730.2 |

OTHER PUBLICATIONS

Research Disclosure No. 37384 May 1995.

*Primary Examiner*—Christopher P. Ellis
*Attorney, Agent, or Firm*—George W. Rauchfuss, Jr.; Gerald K. White

[57] ABSTRACT

A side impact airbag module assembly adapted to mount on the exterior of the side of a seat back of an automobile seat back having an access opening and receiving means within a internal structural member. The side impact airbag module assembly includes an airbag module frame having a mounting flange adapted to extend through the access opening in the seat cover and having thereon self fasteners that secure the flange in the receiving means of the internal structural member of the seat. An airbag cushion and inflator assembly is secured to the frame, and an airbag module cover is also secured to the airbag module frame to conceal and protect the airbag cushion and inflator assembly and the airbag module frame. The airbag module is provided in one variation with depth limiters that prevent the mounting flange from being inserted too far into the receiving means, and clamp supports which further secure the mounting flange to the internal structural member. In another variation, the airbag module has two spaced apart mounting flanges.

17 Claims, 5 Drawing Sheets

EXTERIOR SEAT BACK MOUNTED SIDE IMPACT AIRBAG MODULE ASSEMBLY

FIELD OF THE INVENTION

The present invention relates to an airbag module assembly and, more particularly, to an exterior seat mounted side impact airbag module assembly.

BACKGROUND OF THE INVENTION

Providing a side impact airbag module assembly that can be securely and easily mounted on the exterior of an automobile driver or passenger seat back with minimal changes to the design and manufacture of the seat would be useful.

An airbag module assembly is part of an inflatable restraint system that is employed in an automobile for protecting an occupant against injury by physically restraining the occupant's body when the automobile encounters a collision. The airbag module assembly normally includes an airbag cushion and an inflator that, once triggered by a remote collision sensor, provides the inflation gas for inflating the airbag cushion. As its name implies, a side impact airbag module assembly protects an occupant against an impact to the side of the automobile and is normally positioned somewhere between the occupant and the side of the automobile closest to the occupant. One of the options for a side impact airbag location which has proven advantageous is on the side of a seat back of a seat adjacent the center pillar of the auto. This location is advantageous because the airbag is kept in the optimum firing position, adjacent the driver's upper body, as the seat back is adjusted.

Currently, most seat mounted airbag module assemblies are designed to be installed internally within the seat behind the padding and the upholstery of the seat cover. These internal installations require substantial changes to the design of the seat and also require the seat assembler to handle the airbag module. Internal installations, therefore, increase the chances of module damage during assembly to the seat as well as provide difficulties in accessing the module thereafter for servicing purposes.

Due to the inaccessibility for servicing purposes of an airbag module contained within the seat itself (behind the seat cover upholstery and any foam or other padding) and due to other possible seat structure design concerns, it would be desirable to have a side impact airbag module assembly that attaches to the seat exterior. It would be best, therefore, for the airbag module to fasten to the exterior of the seat during assembly of the automobile and not during assembly of the seat. It would also be desirable if the airbag module does not adversely affect the outer contour of the seat, if possible.

Some side impact airbag module assemblies that are intended to attach externally to the seat require an external attachment means provided by the seat manufacturer or a change in the outer contour of the seat in order to receive the airbag module. These types of airbag module assemblies, accordingly, also require substantial changes to the seat and complicate the design and manufacture of the seat.

In summary, providing a seat mounted side impact airbag module assembly that can be securely and easily mounted to an exterior of the side of a seat back of a seat and does not require substantial changes to the outer contour of the seat or an external attachment means provided by the seat manufacturer would be useful and highly desirable.

SUMMARY OF THE INVENTION

An object, therefore, of the present invention is to provide a side impact airbag module assembly.

Another object of the present invention is to provide an external seat back mounted side impact airbag module assembly.

An additional object of the present invention is to provide an external seat back mounted side impact airbag module assembly that does not require substantial changes to the outer contour of the seat or an external attachment means provided by the seat manufacturer.

In carrying out this invention, there is provided a side impact airbag module assembly mountable on an automobile seat having an access opening and receiving means within an internal structural member of the seat.

The side impact airbag module assembly includes at least one mounting projection adapted to extend through the access opening in the seat and into the receiving means of the internal structural member. The airbag module assembly has at least one self fastener located on the mounting projection for securing the projection within the receiving means. The airbag module also includes an airbag cushion and inflator assembly secured to the mounting projection. The airbag cushion and inflator assembly has an airbag cushion and an inflator connected together so that inflation gas from the inflator will inflate the airbag cushion upon actuation of the inflator.

According to one aspect of the present invention, the side impact airbag module includes an airbag module cover secured to the mounting projection and covering the airbag cushion and inflator assembly and a portion of the mounting projection.

According to another aspect of the present invention, the side impact airbag module includes at least one depth limiter to prevent the mounting projection from being inserted into the receiving means of the structural member past a predetermined point.

According to yet another aspect of the present invention, the airbag module assembly further has at least one clamping support located on the mounting projection for clamping the structural member against the self fastener to further secure the mounting projection to the structural member.

According to a further aspect of the present invention, the mounting projection comprises a single, elongated, flat mounting flange receivable in receiving means in the internal structural member that comprises a slot.

According to still another aspect of the present invention, the mounting projection has a plurality of spaced-apart self fasteners, each self fastener comprising a resilient snap fitting having a distal end that extends generally transversely to and outwardly from the mounting projection. The snap fittings are bendable and bend towards the mounting projection to fit through the receiving means in the structural member as the mounting projection is inserted therein. Once through the receiving means, the snap fittings spring back away from the mounting projection so that the distal ends extend outwardly beyond the receiving means to prevent the mounting projection from being pulled out.

According to a still further aspect of the present invention, the airbag module has a plurality of spaced-apart depth limiters located on the mounting projection. Each depth limiter comprises a tab extending generally transversely to and outwardly from the mounting projection. Each tab has a distal end adapted to extend generally transversely to and outwardly beyond the receiving means to prevent the mounting projection from being inserted into the receiving means past the tab.

According to a yet further aspect of the present invention, the tabs are resilient and are positioned with respect to the snap fittings so that the tabs also comprise the clamping supports and are adapted to abut the structural member to clamp the structural member against the snap fittings.

According to an additional aspect of the present invention, the side impact airbag module assembly has two mounting projections. The mounting projections comprise two flat mounting flanges that are receivable in receiving means in the internal structural member that comprises two slots.

In summary, the present invention provides a side impact airbag module assembly that securely and easily mounts to the exterior of a seat back and does not require substantial changes to the outer contour of the seat or an external attachment means provided by the seat manufacturer.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
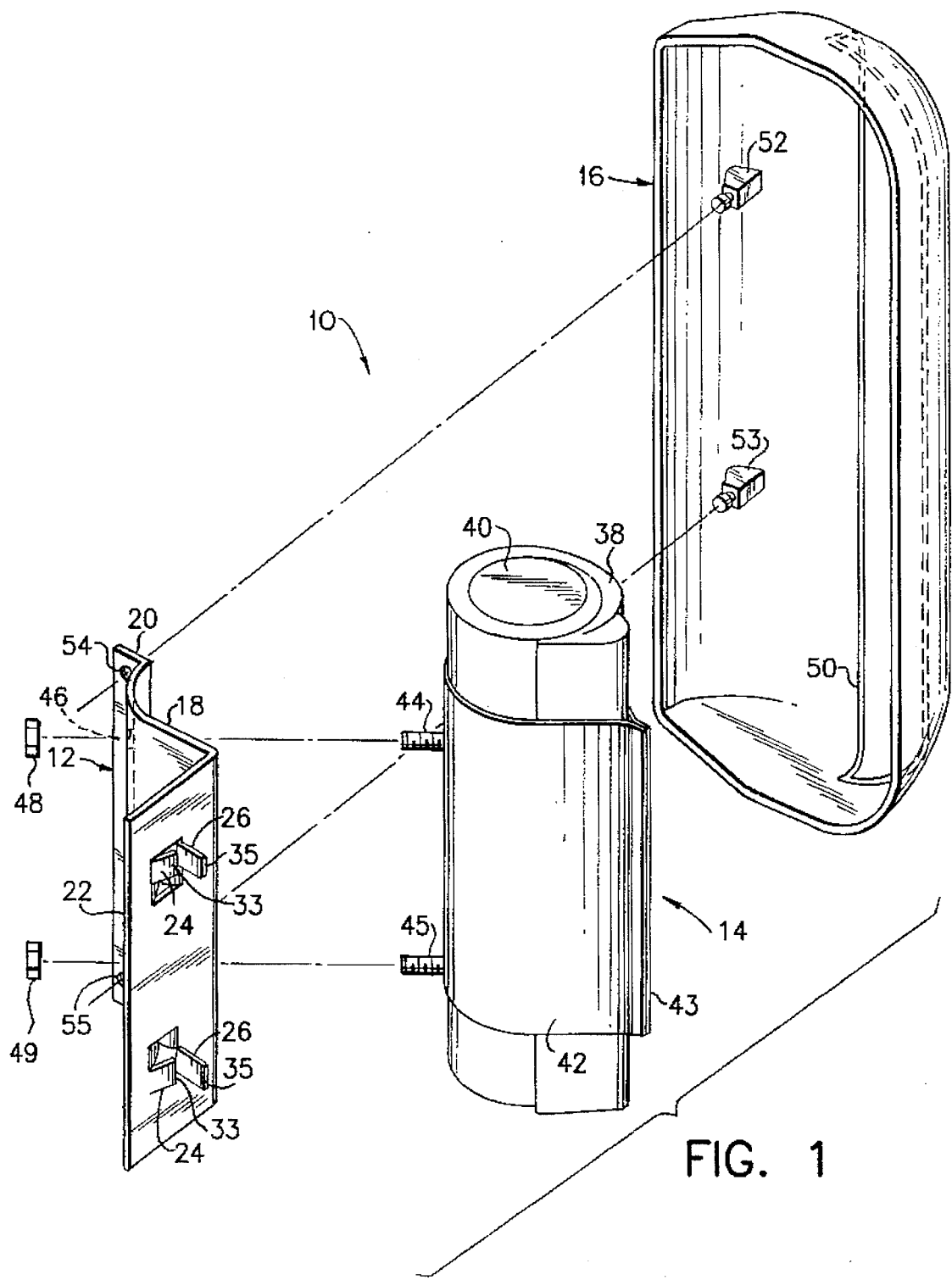
FIG. 1 is an exploded perspective side view of a side impact airbag module assembly according to the present invention.
Figure 2:
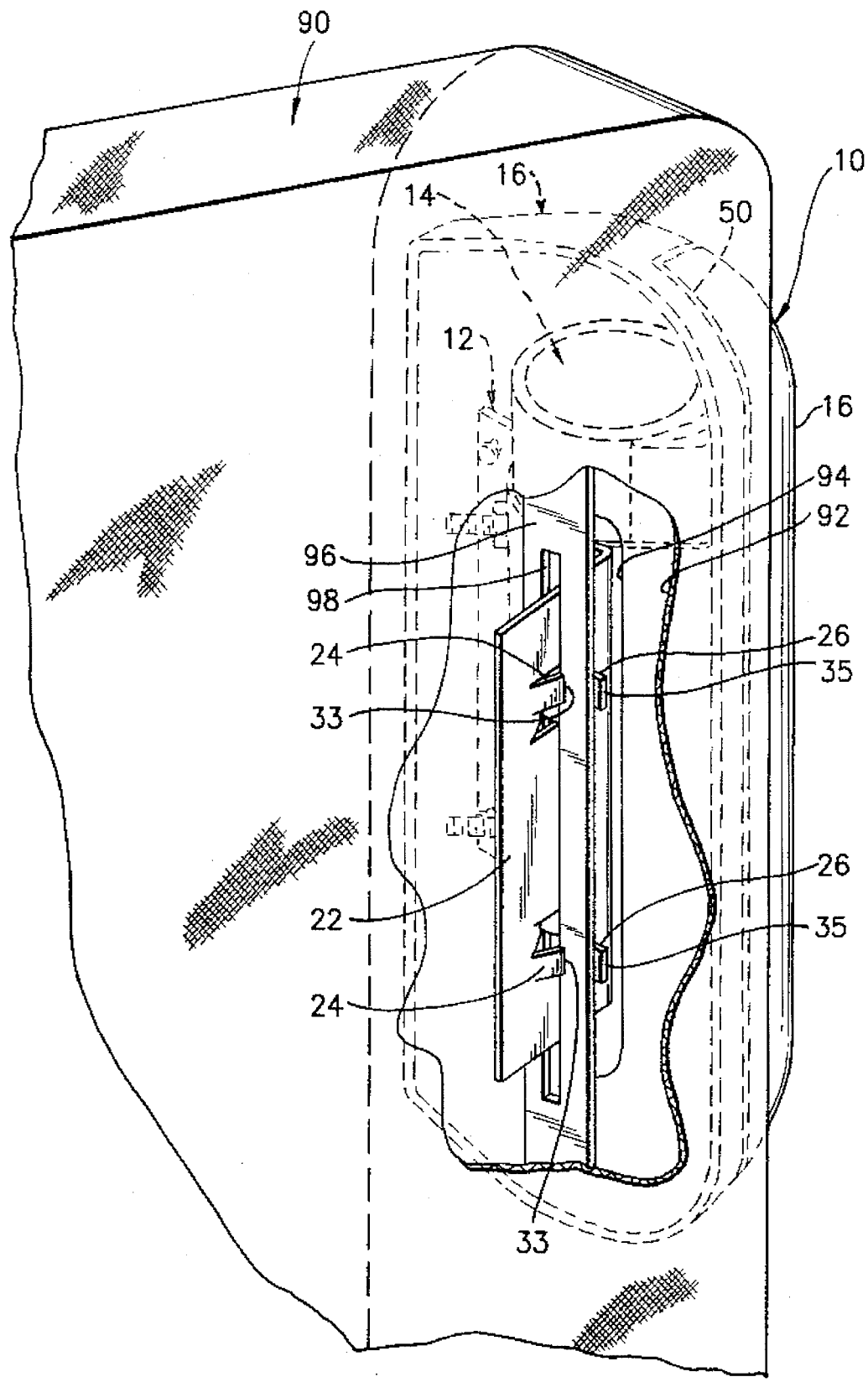
FIG. 2 is a perspective side view of the airbag module assembly of FIG. 1 shown mounted to the side of a seat back of an automobile seat with the seat partially cut-away.
Figure 3:
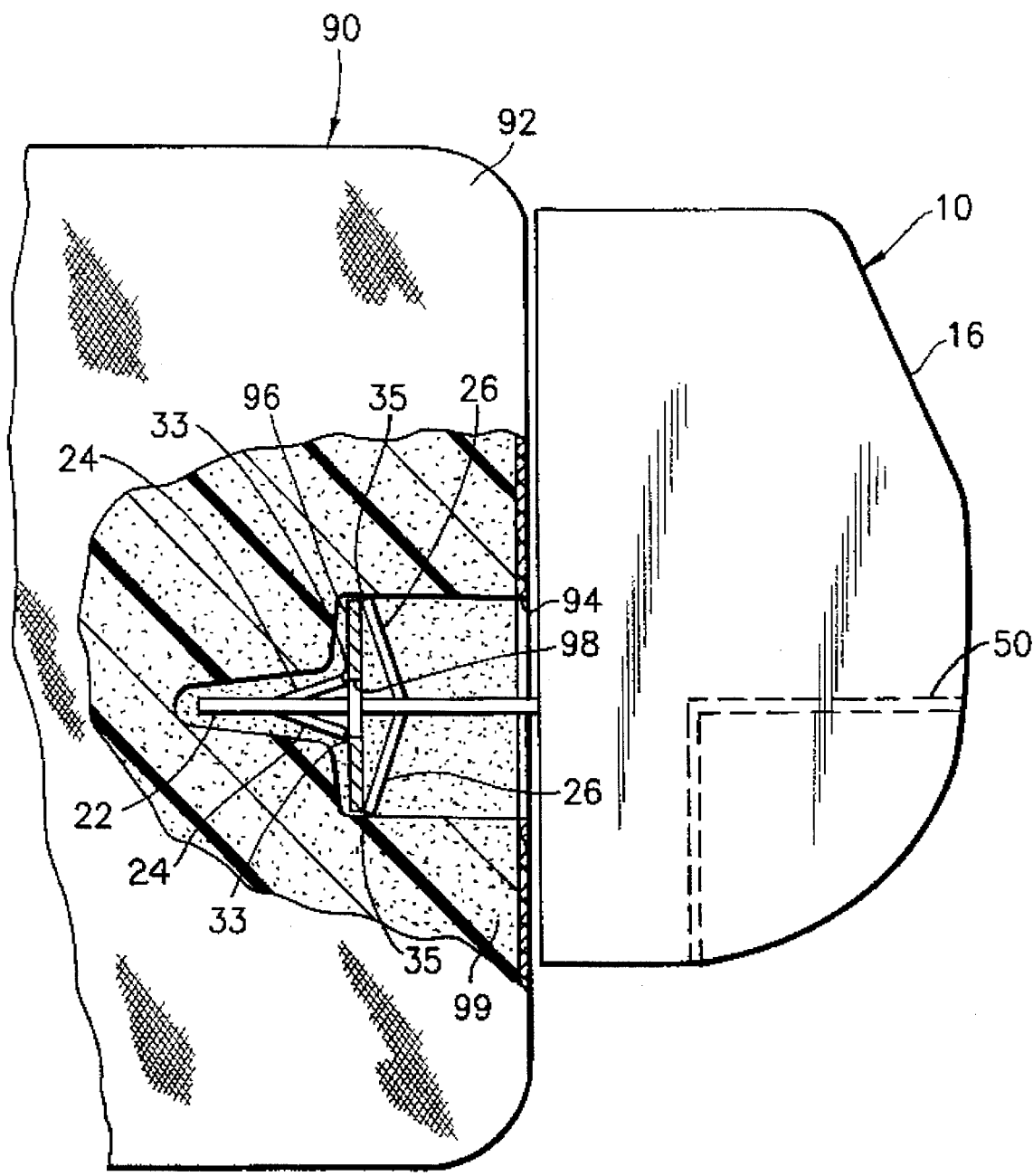
FIG. 3 is a top elevation view of the airbag module assembly of FIGS. 1 and 2 shown mounted to the seat with the seat partially cut-away.

Referring to FIGS. 1 through 3, the present invention is directed to a side impact airbag module assembly 10 adapted to mount on the exterior of an automobile seat 90 having an access opening 94 in a seat cover 92 and receiving means 98 within an internal structural member 96 thereof.

The side impact airbag module assembly 10 includes a module frame 12, an airbag cushion and inflator assembly 14 and a module cover 16. The module frame 12 has an inflator receiving wall 18, a cover receiving bracket 20 and at least one mounting projection 22 adapted to extend through the access opening 94 in the seat cover 92 and into the receiving means 98 of the internal structural member 96 of the seat 90. The airbag module assembly 10 has at least one self fastener 24 located on the mounting projection 22 for securing the mounting projection 22 within the receiving means 98.

The airbag module 10 also includes at least one depth limiter 26 adapted to prevent the mounting projection 22 from being inserted into the receiving means 98 of the structural member 96 past a predetermined point. The airbag module assembly 10 further has at least one clamping support 26, which could be the same element that comprises the depth limiter 26, located on the mounting projection 22 for clamping the structural member 96 against the self fastener 24 to further secure the mounting projection 22 to the structural member 96.

As best seen in FIGS. 2 and 3, the receiving means 98 in the internal structural member 96 of the seat 90 comprises a slot 98, and the mounting projection 22 comprises a single, elongated mounting flange 22. The airbag module 10 has a plurality of self fasteners 24 comprising two pairs of resilient snap fittings 24 having distal ends 33 that extend outwardly from opposite sides of the mounting flange 22. The distal ends 33 face away from the structural member 96 as the flange 22 is inserted into the slot 98 and the snap fittings 24 are bendable and bend towards the mounting flange 22 to fit through the slot 98 as the mounting flange 22 is inserted therein. Once through the slot 98, the snap fittings 24 spring back away from the mounting flange 22 so that the distal ends 33 extend transversely to and outwardly beyond the width of the slot 98 to prevent the mounting flange 22 from being pulled out, thereby securing the mounting flange 22 to the structural member 96.

The depth limiter 26 comprises a tab 26 extending generally transversely to and outwardly from the mounting flange 22 opposite each snap fitting 24. Each tab 26 has a distal end 35 that faces towards the structural member 96 as the flange 22 is inserted into the slot 98 and extends transversely to and outwardly beyond the width of the slot 98. The tabs 26, accordingly, prevent the mounting flange 22 from being inserted into the slot 98 past the tabs 26.

The tabs 26 are resilient and are positioned on the mounting flange 22 with respect to the snap fittings 24 so that the tabs 26 also comprise the clamping supports 26. The tabs 26, and preferably the distal ends 35 of the tabs 26, are adapted to abut the structural member 96 adjacent the slot 98 to clamp the structural member 96 against the snap fittings 24 and further secure the mounting flange 22 to the structural member 96.

The airbag cushion and inflator assembly 14 has an airbag cushion 38 and an inflator 40 assembled together so that inflation gas from the inflator 40 will inflate the airbag cushion 38. The airbag cushion and inflator assembly 14 is described generally as it relates to the instant invention. How an inflator 40 produces inflation gas and is actuated are both known in the art and, accordingly, are not described in detail as they do not in themselves constitute features of the present system. The airbag cushion 38 and inflator 40 are held together by a wrapper 42 having a joint 43 that breaks apart during inflation of the airbag cushion 38. At least two studs 44,45 extend from the airbag cushion and inflator assembly 14 through two respective stud receiving holes 46 (the other stud receiving hole is hidden and therefore not visible, but is positioned similar to hole 46 but in line with stud 45) in the inflator receiving wall 18 of the airbag module frame 12 and are secured thereto by nuts 48,49 or the like.

The airbag module cover 16 is formed from a thermoplastic or other suitable material and has at least one tear seam 50 that the airbag cushion 38 can break through during inflation. The cover 16 also has at least two integral airbag module fasteners 52,53 that extend through two respective fastener receiving holes 54,55 in the cover receiving bracket 20 of the airbag module frame 12. The fasteners 52,53 have burrs or a "christmas tree" configuration, well known in the art, to engage the receiving holes 54,55 and secure the cover 16 to the airbag module frame 12 without the use of separate nuts or the like. The module cover 16 covers the airbag cushion and inflator assembly 10 and a portion of the frame 12. The airbag module cover 16 is adapted to conceal and protect the airbag cushion and inflator assembly 14 and the frame 12, and be flush with the seat cover 92 once the airbag module is mounted to the seat 90. Since the airbag module assembly 10 is adapted to be mounted on the exterior of the seat 90, it is important that the module cover 16 be aesthetically pleasing and blend in with the seat 90 as much as possible.

The airbag module frame 12 is made of a light weight metal or other suitable material, and the snap fittings 24 and tabs 26 are simply punched out of the mounting flange 22. The present invention, therefore, provides a side impact airbag module 10 having a simple and easily manufactured airbag module frame 12 with a mounting flange 22 that securely mounts to an internal structural member 96 of an automobile seat 90.

It is intended that the side impact airbag module assembly 10 will be able to be mounted to the seat 90 by the automobile manufacturer during assembly of the automobile and not be required to be mounted by the seat manufacturer during assembly of the seat 90. The airbag module assembly 10 according to the present invention is mounted to the seat 90 by simply inserting the mounting flange 22 through the access opening 94 in the seat cover 92 and into the slot 98 in the structural member 96. The snap fittings 24 bend in as they pass through the slot 98 and the tabs 26 prevent the flange 22 from being pushed too far into the slot 98. Once through the slot 98, the snap fittings 24 spring back out to prevent the flange 22 from being pulled out of the slot 98 and clamp the structural member 96 against the tabs 26, thereby securing the mounting flange 22 to the structural member 96. The present invention accordingly provides a side impact airbag module assembly that easily and securely mounts to the exterior of the side of a seat back of an automobile driver or passenger seat.

In addition, the present invention provides an externally mounted, side impact airbag module assembly that does not require substantial changes to existing seats. The internal structural member 96 need only be a plate of suitable material, including a rigid plastic or metal, having a slot 98 therein. The tabs 26 may be spaced further apart from the snap fittings 24 to fit a thicker structural member 96. The access opening 94 in the seat cover 92, extending through any foam or seat padding 99 located between the cover 92 and the structural member 96, only has to be large enough to allow access of the mounting flange 22 with extending tabs 26 therethrough.

Figure 4:
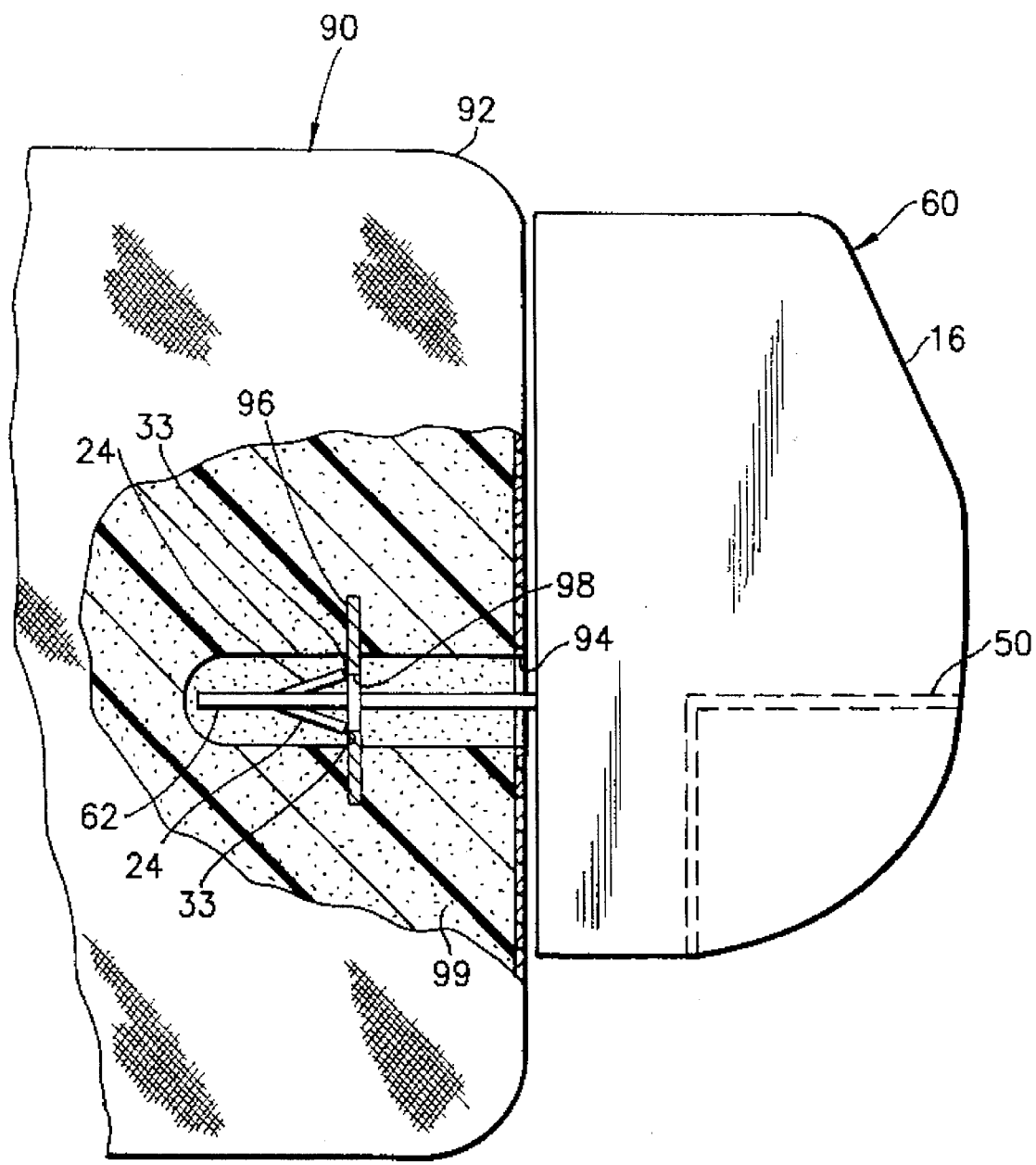
FIG. 4 is a top elevation view of another airbag module assembly according to the present invention shown mounted to the side of a seat back of an automobile seat with the seat partially cut-away.

Referring to FIG. 4, another side impact airbag module assembly 60 according to the present invention is shown. The airbag module 60 has a mounting flange 62 that has only the snap fittings 24 extending outwardly from opposite sides thereof, and does not include the tabs 26 of FIGS. 1 through 3. The snap fittings 24 are resilient and have distal ends 33 that face away from the structural member 96 as the flange 62 is inserted into the slot 98. The snap fittings 24 are bendable and bend towards the mounting flange 62 to fit through the slot 98 as the mounting flange 62 is inserted therein. Once through the slot 98, the snap fittings 24 spring back away from the mounting flange 62 so that the distal ends 33 extend outwardly beyond the width of the slot 98 to prevent the mounting flange 62 from being pulled out and thereby secure the mounting flange 62 to the structural member 96.

Figure 5:
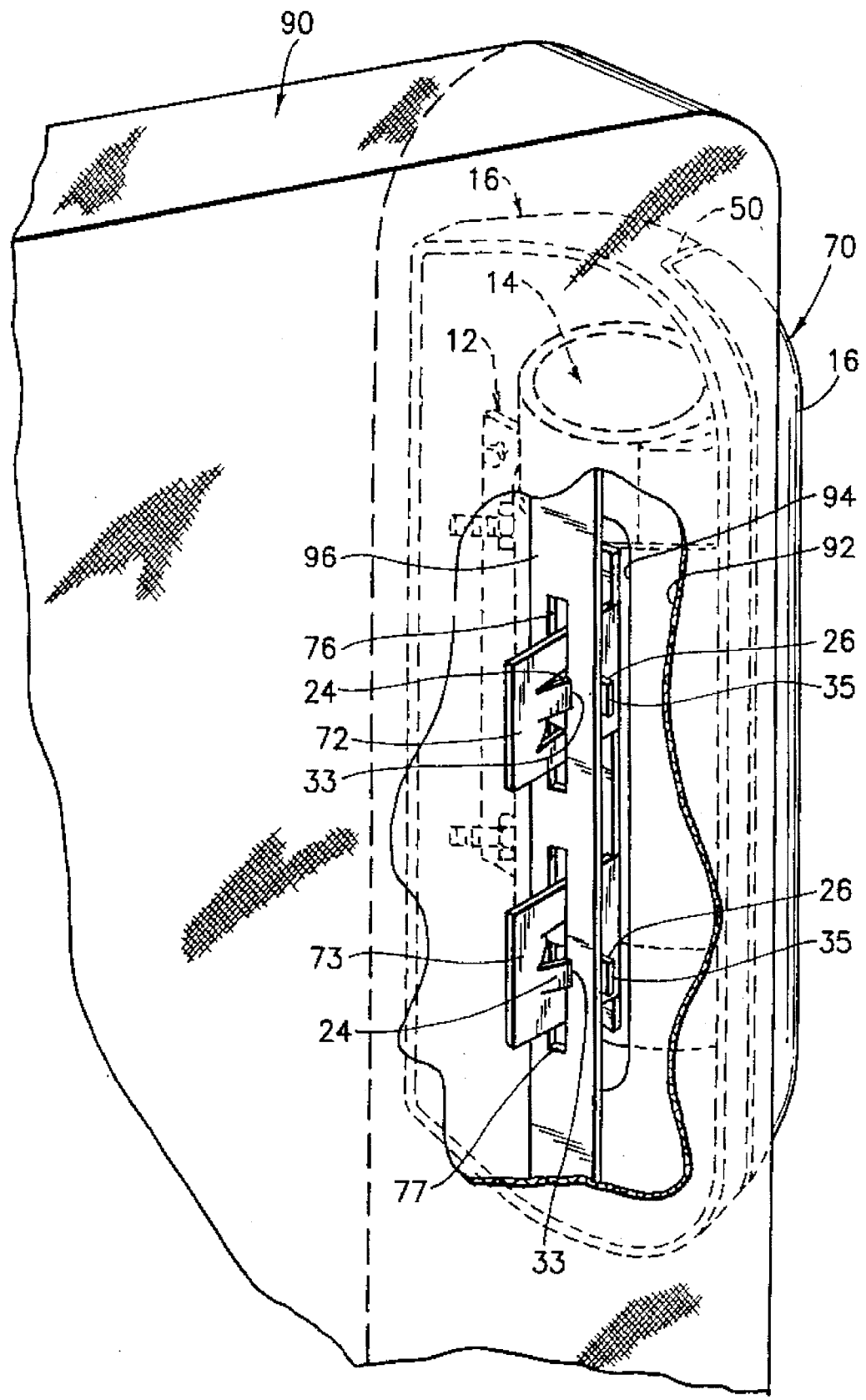
FIG. 5 is a perspective side view of an additional side-impact airbag module assembly shown mounted to the side of a seat back of an automobile seat with the seat partially cut-away.

Referring to FIG. 5, an additional side impact airbag module assembly 70 according to the present invention is shown. The airbag module 70 has two mounting projections 72,73 comprising two spaced apart mounting flanges 72,73. The mounting flanges 72,73 are receivable in a seat 90 having receiving means, in an internal structural member 96, comprising two slots 76,77. Each mounting flange 72,73 has a self fastener comprising a snap fitting 24 extending from opposite sides thereof. Additionally, each mounting flange 72,73 has a tab 26 comprising both a depth limiter and a clamping support extending from opposite sides thereof. The snap fittings 24 bend in as they pass through the slots 76,77 and the tabs 26 prevent the flange 72,73 from being pushed too far into the slot 98. Once through the slots 76,77 the snap fittings 24 spring back out to prevent the flange 72,73 from being pulled out of the slot 98 and clamp the structural member 96 against the tabs 26, thereby securing the mounting flanges 72,73 to the structural member 96.

The present invention may also include other changes and modifications without departing from its true spirit and scope. For example, the mounting projection 22 could comprise one or more cylindrical projections adapted to extend into a receiving means 98 in an internal structural member 96 of a seat 90 comprising circular apertures, each projection having snap fittings 24 thereon. Additionally, the mounting flange 22 could include more or fewer snap fittings 24 or tabs 26. Other variations are possible.

In summary, the present invention provides a side impact airbag module assembly that securely and easily mounts to the exterior of a seat back and does not require substantial changes to the outer contour of the seat or an external attachment means provided by the seat manufacturer.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A side impact airbag module assembly adapted to mount on an automobile seat having an access opening and a receiving means in an internal structural member of the seat, the side impact airbag module assembly comprising:

an airbag cushion and inflator assembly having an airbag cushion and an inflator connected together so that inflation gas from the inflator will inflate the airbag cushion;

at least one mounting projection for extending through the access opening in the seat and into the receiving means of the internal structural member, the mounting projection connected to the airbag cushion and inflator assembly; and at least one self fastener located on the mounting projection for securing the projection within the receiving means; said mounting projection and said internal structure member cooperable together to establish a means to exteriorly mount said airbag module assembly on the automobile seat.

2. A side impact airbag module assembly adapted to mount on an automobile seat having an access opening and a receiving means in an internal structural member of the seat, the side impact airbag module assembly comprising:

an airbag module frame having at least one mounting projection extending from the frame for extending through the access opening in the seat and into the receiving means of the internal structural member;

at least one self fastener located on the mounting projection for securing the projection within the receiving means; and an airbag cushion and inflator assembly having an airbag cushion and an inflator connected together so that inflation gas from the inflator will inflate the airbag cushion, the airbag cushion and inflator assembly secured to the airbag module frame; said mounting projection and said internal structure member cooperable together to establish a means to exteriorly mount said airbag module assembly on the automobile seat.

3. The side impact airbag module assembly of claim 2 further comprising at least one depth limiter for preventing the mounting projection from being inserted into the receiving means of the structural member past a predetermined point.

4. The airbag module of claim 3 wherein the at least one depth limiter comprises at least one tab extending generally transversely to and outwardly from the mounting projection, the at least one tab having a distal end adapted to extend outwardly beyond the receiving means to prevent the mounting projection from being inserted into the receiving means past the the at least one tab.

5. The side impact airbag module assembly of claim 2 further comprising at least one clamping support located on the mounting projection for clamping the structural member against the self fastener to further secure the mounting projection to the structural member.

6. The side impact airbag module assembly of claim 2 further comprising an airbag module cover secured to the airbag module frame and covering the airbag cushion and inflator assembly and a portion of the airbag module frame.

7. The side impact airbag module assembly of claim 2 wherein the at least one self fastener comprises a plurality of spaced-apart self fasteners, each self fastener comprising a resilient snap fitting having a distal end extending generally transversely to and outwardly from a side of the mounting projection, the snap fittings are bendable for bending towards the mounting projection to fit through the receiving means in the structural member as the mounting projection is inserted therein and, once through the receiving means, for springing back away from the mounting projection so that the distal ends extend outwardly beyond the receiving means to prevent the mounting projection from being pulled out.

8. The side impact airbag module assembly of claim 2 wherein the at least one mounting projection comprises two spaced apart mounting projections, each mounting projection comprising a flat mounting flange receivable in the receiving means which comprises two slots in the internal structural member.

9. The side impact airbag module assembly of claim 2 wherein the mounting projection comprises a single, elongated, flat mounting flange receivable in the receiving means which comprises a slot in the internal structural member.

10. The side impact airbag module assembly of claim 9 wherein the at least one self fastener comprises a plurality of spaced-apart self fasteners, each self fastener comprising a resilient snap fitting having a distal end extending generally transversely to and outwardly from a side of the mounting flange, the snap fittings are bendable for bending towards the mounting flange to fit through the slot in the structural member as the mounting flange is inserted therein and, once through the slot, for springing back away from the mounting flange so that the distal ends extend outwardly beyond the slot to prevent the mounting flange from being pulled out.

11. The side impact airbag module assembly of claim 10 further comprising at least one depth limiter for preventing the mounting flange from being inserted into the slot of the structural member past a predetermined point.

12. The airbag module of claim 11 wherein the at least one depth limiter comprises a plurality of spaced-apart depth limiters located on the mounting flange, each depth limiter comprising a tab extending generally transversely to and outwardly from the mounting flange, each tab having a distal end extending generally transversely to and outwardly beyond the slot to prevent the mounting flange from being inserted into the slot past the tab.

13. The side impact airbag module assembly of claim 12 further having at least one clamping support located on the mounting flange for clamping the structural member against the snap fittings to further secure the mounting flange to the structural member.

14. The side impact airbag module of claim 13 wherein the tabs are resilient and are positioned with respect to the snap fittings so that the tabs also comprise the clamping supports and are adapted to abut the structural member to clamp the structural member against the snap fittings.

15. A side impact airbag module assembly adapted to mount on an automobile seat having receiving means within an internal structural member and an access opening in the seat, the side impact airbag module assembly comprising:

an airbag module frame having a cover receiving bracket, an inflator receiving wall extending from the cover receiving bracket and at least one mounting projection extending from the inflator receiving wall for extending through the access opening into the receiving means of the internal structural member of the automobile seat;

at least one self fastener located on the mounting projection for securing the projection within the receiving means;

an airbag cushion and inflator assembly having an airbag cushion and an inflator connected together so that inflation gas from the inflator will inflate the airbag cushion, the airbag cushion and inflator assembly secured to the inflator receiving wall of the airbag module frame; and an airbag module cover having at least one tear seam, the cover secured to the cover receiving bracket of the airbag module frame covering the airbag cushion and inflator assembly and the airbag module frame, and adapted to be flush with the automobile seat; said mounting projection and said internal structure member cooperable together to establish a means to exteriorly mount said airbag module assembly on the automobile seat.

16. The side impact airbag module assembly of claim 15 wherein the at least one mounting projection comprises a single, elongated, flat mounting flange receivable in the receiving means comprising a slot in the internal structural member, the at least one self fastener comprising at least two pairs of self fasteners, each pair of self fasteners comprising a pair of resilient snap fittings having distal ends extending outwardly from opposite sides of the mounting flange, the snap fittings are bendable and for bending towards the mounting flange to fit through the slot in the structural member as the mounting flange is inserted therein and, once through the slot, for springing back away from the mounting flange so that the distal ends extend outwardly beyond the slot to prevent the mounting flange from being pulled out, and the airbag assembly further including at least two tabs extending outwardly from opposite sides of the mounting flange between the snap fittings and the inflator receiving wall, each tab having a distal end adapted to extend generally transversely to and outwardly beyond the slot to prevent the mounting flange from being inserted into the slot past the tabs, the tabs positioned with respect to the snap fittings so that the tabs are adapted to abut the structural member to clamp the structural member against the snap fittings.

17. The side impact airbag module assembly of claim 15 wherein the at least one mounting projection comprises two flat mounting flanges respectively receivable in the receiving means comprising two slots in the internal structural member, the at least one self fastener comprising at least two resilient snap fittings located on each mounting flange, the resilient snap fittings having distal ends extending outwardly from opposite sides of the mounting flange, the snap fittings are bendable for bending towards the mounting flanges to fit through the slots in the structural member as the mounting flanges are inserted therein and, once through the slots, for springing back away from the mounting flanges so that the distal ends extend outwardly beyond the slots to prevent the mounting flanges from being pulled out, and the airbag module assembly further including at least two tabs located on each mounting flange, the tabs extending outwardly from opposite sides of each mounting flange between the snap fittings and the inflator receiving wall, each tab having a distal end adapted to extend outwardly beyond the slot to prevent the mounting flange from being inserted into the slot past the tabs, the tabs positioned with respect to the snap fittings so that the tabs are adapted to abut the structural member to clamp the structural member against the snap fittings.

* * * * *